(12) United States Patent  (10) Patent No.: US 12,487,250 B2
Jiang et al.  (45) Date of Patent: Dec. 2, 2025

(54) APPARATUS AND METHOD FOR DETECTING DEVICE DROP

(71) Applicant: SAMSUNG ELECTRONICS CO., LTD., Suwon-si (KR)

(72) Inventors: Wenjun Jiang, San Jose, CA (US); Tianwei Xing, Santa Clara, CA (US); Xun Chen, Fremont, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 18/202,796

(22) Filed: May 26, 2023

(65) Prior Publication Data
US 2024/0192249 A1 Jun. 13, 2024

Related U.S. Application Data

(60) Provisional application No. 63/430,860, filed on Dec. 7, 2022.

(51) Int. Cl.
G01P 15/18 (2013.01)
G01P 3/44 (2006.01)
G01P 15/08 (2006.01)

(52) U.S. Cl.
CPC .............. *G01P 15/18* (2013.01); *G01P 3/44* (2013.01); *G01P 15/0891* (2013.01)

(58) Field of Classification Search
CPC ......... G01P 15/0891; G01P 15/18; G01P 3/44
See application file for complete search history.

(56) References Cited

U.S. PATENT DOCUMENTS

| 7,451,057 | B2 | 11/2008 | Kim et al. |
| 7,690,253 | B2 | 4/2010 | Noda et al. |
| 8,408,041 | B2 | 4/2013 | Ten Kate et al. |
| 9,689,887 | B1* | 6/2017 | Srinivas ................. G01C 15/00 |
| 10,863,926 | B2 | 12/2020 | Lee et al. |

(Continued)

FOREIGN PATENT DOCUMENTS

| JP | 2007-101406 A | 4/2007 |
| JP | 2013-130532 A | 7/2013 |

(Continued)

OTHER PUBLICATIONS

Li et al., "Accurate, Fast Fall Detection Using Gyroscopes and Accelerometer-Derived Posture Information", Jun. 2009.*

(Continued)

*Primary Examiner* — Helen C Kwok
(74) *Attorney, Agent, or Firm* — Sughrue Mion, PLLC

(57) ABSTRACT

A method for detecting a drop event of an electronic device, may include: obtaining an angular velocity and a proper acceleration of the electronic device based on sensor data received from an inertial measurement unit (IMU) sensor of the electronic device; obtaining centripetal acceleration of the electronic device based on the angular velocity, principal moments of inertia of the electronic device, and position of the IMU sensor within the electronic device; based on an acceleration difference between the centripetal acceleration and the proper acceleration, determining whether the electronic device is in a fall state; and based on the electronic device being determined to be in the fall state, providing an analysis result of the drop event.

19 Claims, 9 Drawing Sheets

(56) References Cited

U.S. PATENT DOCUMENTS

| | | |
|---|---|---|
| 11,243,129 B2 | 2/2022 | Shin et al. |
| 11,521,093 B2 | 12/2022 | Kim et al. |
| 2008/0236282 A1 | 10/2008 | Kim et al. |
| 2015/0046116 A1* | 2/2015 | Eatwell ................. G01L 5/0052 |
| | | 702/150 |
| 2015/0260514 A1* | 9/2015 | Menelas ................. G01N 19/02 |
| | | 702/2 |
| 2018/0174420 A1* | 6/2018 | Clark ..................... G08B 25/10 |
| 2019/0022858 A1* | 1/2019 | Niemeyer .............. G05D 1/105 |
| 2022/0001550 A1 | 1/2022 | Son et al. |
| 2022/0291758 A1 | 9/2022 | Wang et al. |
| 2024/0412612 A1* | 12/2024 | Nickel ............... G08B 21/0492 |

FOREIGN PATENT DOCUMENTS

| | | |
|---|---|---|
| KR | 10-1725773 B1 | 4/2017 |
| KR | 10-2019-0102140 A | 9/2019 |

OTHER PUBLICATIONS

International Search Report and Written Opinion issued by the International Searching Authority on Oct. 12, 2023 in International Patent Application No. PCT/KR2023/009438(PCT/ISA/220, PCT/ISA/210, and PCT/ISA/237).

\* cited by examiner

APPARATUS AND METHOD FOR DETECTING DEVICE DROP

CROSS-REFERENCE TO RELATED APPLICATION(S)

This application is based on and claims priority under 35 U.S.C. § 119 to U.S. Provisional Patent Application No. 63/430,860 filed on Dec. 7, 2022, in the U.S. Patent & Trademark Office, the disclosure of which is incorporated herein by reference in its entirety.

BACKGROUND

1. Field

The disclosure relates to an apparatus and a method for detecting and analyzing drop events of mobile devices.

2. Description of Related Art

Drops can cause damage to some devices, such as cracking the screen of a phone or causing earbuds to become lost. However, drops can also provide useful information for other devices, such as smart sports devices, which can provide context about the motion of a smart basketball.

Recording drop events is important for businesses to intervene before real damage occurs. Manually recording drop events is laborious and inaccurate, making automatic detection and analysis favorable. With the increasing sensing, computing, and communication capabilities of mobile devices, they have become useful platforms for sensing and analyzing drop events.

A typical drop event consists of two events, a free fall followed by an impact. Free fall detection can be challenging due to factors such as the position of an inertial measurement unit (IMU) sensor in a mobile device and the mass distribution of the mobile device. Traditional methods use a fixed sampling rate, which may make it difficult to balance the conflicting requirement of high signal resolution and low power consumption, which either leads to consuming excessive energy with a high sampling rate, or missing some transient features such as the impact with a low sampling. Thus, there is a need for adaptively controlling the sampling rate of the sensors.

Additionally, some device parameters may affect the readings of the IMU sensor, and it may be difficult to measure or change in use. Thus, there is a need for calculating or correcting parameters of the mobile devices in a simple way.

SUMMARY

According to an aspect of the present disclosure, a method for detecting a drop event of an electronic device, may include: obtaining an angular velocity and a proper acceleration of the electronic device based on sensor data received from an inertial measurement unit (IMU) sensor of the electronic device; obtaining centripetal acceleration of the electronic device based on the angular velocity, principal moments of inertia of the electronic device, and position of the IMU sensor within the electronic device; based on an acceleration difference between the centripetal acceleration and the proper acceleration, determining whether the electronic device is in a fall state; and based on the electronic device being determined to be in the fall state, providing an analysis result of the drop event.

The method may further include: determining that the electronic device is in the fall state when the acceleration difference between the centripetal acceleration and the proper acceleration is less than a first predetermined threshold.

The method may further include: determining that the electronic device is in the fall state when the angular velocity is not within a measurement range of the IMU sensor and truncation of the sensor data has occurred.

A first trigger condition may be satisfied when the acceleration difference between the centripetal acceleration and the proper acceleration is less than a first predetermined threshold, and a second trigger condition may be satisfied when the angular velocity is not within a measurement range of the IMU sensor and truncation of the sensor data has occurred. The method may further include: determining that the electronic device is in the fall state when at least one of the first trigger condition and the second trigger condition is satisfied and a magnitude of the proper acceleration in a z-axis direction of the electronic device is less than a second predetermined threshold, wherein the z-axis direction of the electronic device is a direction in which a shortest side of the electronic device extends.

The method may further include: based on the electronic device being determined to be in the fall state, increasing a sampling rate for collecting the sensor data from the IMU sensor.

The method may further include: detecting an impact on the electronic device based on a magnitude of the proper acceleration; based on the impact being detected, determining a fall duration during which the electronic device maintains the fall state until the impact is detected; and verifying the drop event of the electronic device based on the fall duration.

The detecting of the impact on the electronic device may include: determining that the impact has occurred based on the magnitude of the proper acceleration, and at least one of a change of the angular velocity over time, a change of the proper acceleration over time, and a magnitude of the proper acceleration in a z-axis direction of the electronic device, wherein the z-axis direction of the electronic device is a direction in which a shortest side of the electronic device extends.

The method may further include: determining the principal moments of inertia of the electronic device based on predetermined principal moments of inertia of a device type corresponding to the electronic device, and angular velocity data and proper acceleration data collected during previous drops of the electronic device.

The determining of the principal moments of inertia of the electronic device may further include: applying an objective function to the predetermined principal moments of inertia and a variance of the angular velocity data and the proper acceleration data collected during the previous drops of the electronic device, to minimize a variance of rotational kinetic energy while minimizing a difference between the principal moments of inertia of the electronic device and the predetermined principal moments of inertia.

According to another aspect of the present application, an electronic device for detecting a drop event, may include: an inertial measurement unit (IMU) sensor configured to collect sensor data that indicates an angular velocity and a proper acceleration of the electronic device; at least memory storing instructions; and at least one processor configured to execute the instructions to: obtain the angular velocity and the proper acceleration of the electronic device based on the sensor data; obtain centripetal acceleration of the electronic device based on the angular velocity, principal moments of inertia of the electronic device, and position of the IMU sensor within the electronic device; based on an acceleration difference between the centripetal acceleration and the proper acceleration, determine whether the electronic device is in a fall state; and based on the electronic device being determined to be in the fall state, provide an analysis result of the drop event.

The at least one processor may be further configured to execute the instructions to: determine that the electronic device is in the fall state when the acceleration difference between the centripetal acceleration and the proper acceleration is less than a first predetermined threshold.

The at least one processor may be further configured to execute the instructions to: determine that the electronic device is in the fall state when the angular velocity is not within a measurement range of the IMU sensor and truncation of the sensor data has occurred.

A first trigger condition may be satisfied when the acceleration difference between the centripetal acceleration and the proper acceleration is less than a first predetermined threshold, and a second trigger condition may be satisfied when the angular velocity is not within a measurement range of the IMU sensor and truncation of the sensor data has occurred. The at least one processor may be further configured to execute the instructions to: determine that the electronic device is in the fall state when at least one of the first trigger condition and the second trigger condition is satisfied and a magnitude of the proper acceleration in a z-axis direction of the electronic device is less than a second predetermined threshold, wherein the z-axis direction of the electronic device is a direction in which a shortest side of the electronic device extends.

The at least one processor may be further configured to execute the instructions to: based on the electronic device being determined to be in the fall state, increase a sampling rate for collecting the sensor data from the IMU sensor.

The at least one processor may be further configured to execute the instructions to: detect an impact on the electronic device based on a magnitude of the proper acceleration; based on the impact being detected, determine a fall duration during which the electronic device maintains the fall state until the impact is detected; and verify the drop event of the electronic device based on the fall duration.

The at least one processor may be further configured to execute the instructions to: determine that the impact has occurred based on the magnitude of the proper acceleration, and at least one of a change of the angular velocity over time, a change of the proper acceleration over time, and a magnitude of the proper acceleration in a z-axis direction of the electronic device, wherein the z-axis direction of the electronic device is a direction in which a shortest side of the electronic device extends.

The at least one processor may be further configured to execute the instructions to: determine the principal moments of inertia of the electronic device based on predetermined principal moments of inertia of a device type corresponding to the electronic device, and angular velocity data and proper acceleration data collected during previous drops of the electronic device.

The at least one processor may be further configured to execute the instructions to: apply an objective function to the predetermined principal moments of inertia and a variance of the angular velocity data and the proper acceleration data collected during the previous drops of the electronic device, to minimize a variance of rotational kinetic energy while minimizing a difference between the principal moments of inertia of the electronic device and the predetermined principal moments of inertia.

According to another aspect of the present disclosure, a non-transitory computer readable storage medium that stores instructions to be executed by at least one processor to perform the method for detecting the drop event of the electronic device is provided.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
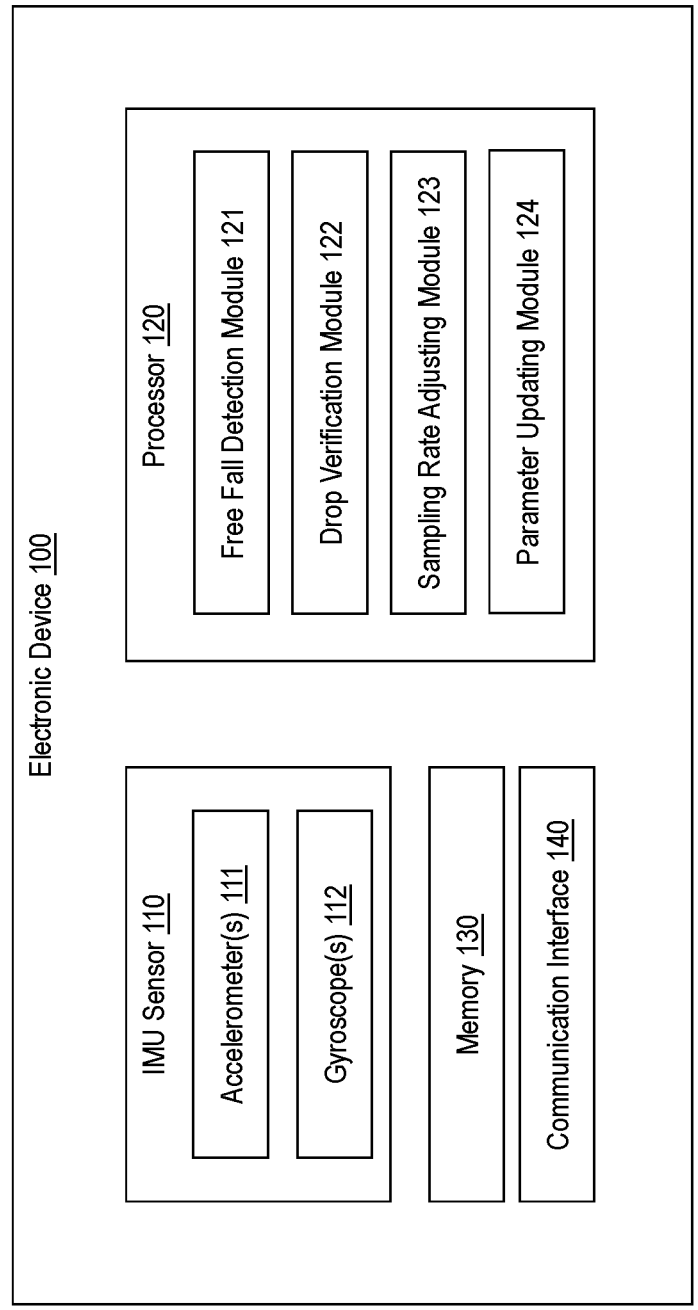
FIG. 1 is a block diagram illustrating a structure of an electronic device according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

The term "proper acceleration" may refer to a physical acceleration experienced by an object (e.g., an acceleration measured by an accelerometer included in or attached to the object), relative to free-fall.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more example embodiments provide a drop detection framework that can be widely applied to mobile devices with an inertial measurement unit (IMU) sensor on board. The framework collects proper acceleration and angular velocity from an accelerometer and a gyroscope of a mobile device, respectively, and uses a device-aware free fall detection algorithm to detect free fall based on the proper acceleration, the angular velocity, and intrinsic device parameters (e.g., principal moments of inertia of the mobile device and the position of the IMU sensor inside the mobile device) of the mobile device, and verify if a piece of IMU data represents the mobile device being dropped.

An adaptive sampling scheme may be used to poll the IMU sensor data with low sampling rate when the mobile device is in normal use to save energy, while polling the IMU sensor data with high sampling rate during free-fall, so as to resolve the conflicting requirement of low power consumption and high signal resolution.

One or more example embodiments may also provide a data-driven method to correct the estimation of the principal moments of inertia of the mobile device and estimate the position of the IMU sensor in the mobile device.

FIG. 1 is a block diagram illustrating a structure of an electronic device 100 according to embodiments of the present disclosure.

As shown in FIG. 1, the electronic device 100 includes an inertial measurement unit (IMU) sensor 110, a processor 120, a memory 130, and a communication interface 140.

The IMU sensor 110 may include an accelerometer 111 and a gyroscope 112. The accelerometer 111 and the gyroscope 112 may be used together in a drop detection system to provide more accurate and reliable data.

The accelerometer 111 may measure changes in linear acceleration in one or more directions, including a proper acceleration. When the electronic device 100 is dropped, it experiences an acceleration in the direction of the drop, which is detected by the accelerometer 111 that is included in the electronic device 100.

The gyroscope 112 may detect changes in rotational acceleration or angular velocity. In drop detection, the gyroscope 112 may detect any rotation or spinning of the device during the drop.

Both the accelerometer 111 and the gyroscope 112 may send the sensor data streams to the processor 120, which may determine whether a free-fall and a true drop (i.e., a free-fall followed by an impact) have occurred, based on the proper acceleration and the angular velocity.

The memory 130 may include device parameters such as principal moments of inertia of the electronic device 100 and the position of the IMU sensor 110 inside the electronic device 100. The device parameters may be predetermined device parameters, and/or may be updated or corrected based on sensor data collected from the IMU sensor 110. For example, the memory 130 may store predetermined values of moments of inertia of a product type corresponding to the electronic device 100, which is pre-calculated based on shape information of the electronic device 100 (e.g., a length, a width, and a depth of the electronic device 100).

According to embodiments of the present disclosure, the processor 120 may include a free fall detection module 121, a drop verification module 122, a sampling rate adjusting module 123, and a parameter updating module 124. The processor 120 may jointly consider the accelerometer and gyroscope readings and the device parameters (e.g., principal moments of inertia of the electronic device 100 and the relative position of the IMU sensor 110 inside the electronic device 100) to determine whether the electronic device 100 experiences free fall and to verify the accelerometer and gyroscope data representing the electronic device 100 being dropped. The processor 120 is capable of estimating free-fall no matter whether the IMU sensor 110 is at the center of mass of the electronic device 100 or how the electronic device 100 rotates during the free fall.

Traditional methods rely solely on accelerometers to detect free fall, often assuming that an IMU sensor is located at the center of mass of a mobile device or that the free fall involves minimal rotation. In such cases, the accelerometer reading is expected to fall below a certain threshold. Alternatively, some conventional methods assume that significant rotation during free fall will produce a substantial acceleration, which can be detected through a large accelerometer reading. However, these approaches may only be effective for specific scenarios, such as detecting the drop of a bowling ball. The conventional methods are not suitable for general drop detection, as the rotation during free fall can be arbitrary, causing the measured acceleration to vary widely within the accelerometer's range.

To address this limitation, the free fall detection module 121 according to embodiments of the present disclosure may determine whether a free fall has occurred, based on accelerometer and gyroscope readings and relevant device parameters.

The free fall detection module 121 may detect free fall of the electronic device 100 by jointly using the accelerometer 111 and the gyroscope 112. Specifically, when the electronic device 100 is rotating and its proper acceleration and angular velocity are within the measurement ranges of the accelerometer 111 and the gyroscope 112, respectively, the free fall detection module 121 may compute a centripetal acceleration of the electronic device 100 based on the angular velocity captured by the gyroscope 112. This free fall detection module 121 may then compare the computed centripetal acceleration with the proper acceleration captured by the accelerometer 111 to determine if the electronic device 100 is in free fall.

Assuming that (1) a vector I of principal moments of inertia of the electronic device 100 and a relative position r of the IMU sensor 110 in the electronic device 100 are expressed as $I=(I_x, I_y, I_z)^T$ and $r=(r_x, r_y, r_z)^T$, (2) the vector I of principal moments of inertia of the electronic device 100 and the relative position r of the IMU sensor 110 in the electronic device 100 are both known, (3) the proper acceleration $a_i$, the centripetal acceleration $a'_i$, the angular velocity $\omega_i$ of an i-th sample of sensor data are expressed as $a_i=(a_{xi}, a_{yi}, a_{zi})^T$, $a'_i=(a'_{xi}, a'_{yi}, a'_{zi})^T$ and $\omega_i=(\omega_{xi}, \omega_{yi}, \omega_{zi})^T$, and (4) $I_a$, $I_p$, and $I_c$ are expressed as $$I_a = \frac{I_y - I_z}{I_x},$$

$$I_b = \frac{I_z - I_x}{I_y},$$

$$I_c = \frac{I_x - I_y}{I_z},$$

respectively, the electronic device 100 uses the relationship between a centripetal acceleration $a'_i$ and an angular velocity $\omega_i$ which is expressed as follows:

$$a'_i = M(\omega_i, I)r \qquad \text{Equation (1)}$$

wherein $$M(\omega_i, I) = \begin{bmatrix} -(\omega_{yi}^2 + \omega_{zi}^2) & (1 - I_c)\omega_{xi}\omega_{yi} & (1 + I_b)\omega_{xi}\omega_{zi} \\ (1 + I_c)\omega_{xi}\omega_{yi} & -(\omega_{xi}^2 + \omega_{zi}^2) & (1 - I_a)\omega_{zi}\omega_{yi} \\ (1 - I_b)\omega_{xi}\omega_{zi} & (1 + I_a)\omega_{zi}\omega_{yi} & -(\omega_{xi}^2 + \omega_{yi}^2) \end{bmatrix}$$

$M(\omega_i, I)$ represents a transition matrix M with a function of $\omega_i$ and I. If an acceleration difference $\|a'_i - a_i\|$ between the calculated centripetal acceleration $a'_i$ and the measured proper acceleration $a_i$ is less than a predetermined threshold $t_1$, the net force in the electronic device 100 is considered close to gravity, and the free fall detection module 121 may determine that the electronic device 100 is in free fall. In other words, the free fall detection module 121 may determine that the electronic device 100 is in a free fall state when the acceleration difference $\|a'_i - a_i\|$ between the calculated centripetal acceleration $a'_i$ and the measured proper acceleration $a_i$ is less than the predetermined threshold $t_1$.

In addition to a first trigger condition for detecting free fall based on the acceleration difference $\|a'_i - a_i\|$, another condition may be used to reduce a false negative rate (i.e., the miss of a true fall event) which occurs when the proper acceleration or the angular velocity exceeds the measurement ranges of the accelerometer 111 or the gyroscope 112, resulting in truncated sensor data being read.

For example, sensor data truncation is likely to occur when the electronic device 100 is rotating rapidly during free fall. Considering the measurement ranges of the accelerometer 111 and the gyroscope 112 and the intrinsic parameters (e.g., principal moments of inertia I and a relative position r of the IMU sensor 110 in the electronic device 110), gyroscope readings are more susceptible to truncation than accelerometer readings during fast rotation. Accordingly, the free fall detection module 121 may use the truncation of gyroscope readings as a second trigger condition for detecting free fall.

Further, the free fall detection module 121 may use an absolute value of gyroscope readings to enhance the first and the second trigger conditions.

For example, if the electronic device 100 is a thin smartphone and has a small position component $r_z$ in the thickness direction (i.e., the position component $r_z$ in a z-axis), rotation of the electronic device 100 may cause little influence on the thickness direction of its corresponding accelerometer axis. As a result, an absolute value of the position component $r_z$ may remain low when the electronic device 100 is in free fall, making it insensitive to rotation. To account for this scenario, the free fall detection module 121 may use an enhanced condition on the first and second trigger conditions, which is satisfied when the absolute value of a proper acceleration $a_{zi}$ in the thickness direction is less than a predetermined threshold $TH_z$. When one of the above-mentioned first and second trigger conditions is satisfied, with or without the enhanced condition, the free fall detection module 121 may determine that the electronic device 100 is in free fall.

However, the trigger conditions for detecting free fall are not limited to the above-mentioned trigger conditions, and other conditions (e.g., truncation of accelerometer reading) may be also used.

The drop verification module 122 may verify whether a true drop event has occurred, based on free fall detection that is output from the free fall detection module 121, because not all events that trigger the free fall condition are actual drops. For instance, if a user shakes the electronic device 100 quickly, the second trigger condition (i.e., fast rotation) may also be met. Therefore, the drop verification module 122 may use a drop verification algorithm to identify whether a true drop has taken place and determine the start and end times of the drop.

According to embodiments of the present application, the drop verification module 122 may apply two drop verification conditions, while the drop verification algorithm may not be limited thereto. A first drop verification condition involves detecting an impact on the electronic device 100, while a second drop verification condition involves determining whether the device remains in free fall for a sufficient amount of time before the impact.

The first drop verification condition may involve a set of impact detection conditions. The electronic device 100 can recognize that an impact has taken place if any one or any combination of the following conditions is met.

Impact Detection Condition 1: a magnitude of accelerometer reading $\|a_i\|$ exceeds a predetermined threshold $t_2$.

Impact Detection Condition 2: a change of accelerometer reading $\|a_i - a_j\|$ exceeds a predetermined threshold $t_3$, wherein j<i.

Impact Detection Condition 3: a change of gyroscope reading $\|g_i\text{-}g_j\|$ exceeds a predetermined threshold $t_4$, wherein j<i.

Impact Detection Condition 4: a change of one dimension of the accelerometer reading exceeds a predetermined threshold $t_5$.

Impact Detection Condition 5: an absolute value of the dimension of the accelerometer reading corresponding to the shortest element in position vector r (e.g., $|a_{zi}|$ for shortest $r_z$) exceeds a predetermined threshold $t_6$.

The electronic device 100 may use the second drop verification to detect whether the electronic device 100 stays in the free fall over enough time before the impact.

When the electronic device 100 is in free fall, the electronic device 100 is typically in a state of torque-free motion. During the torque-free motion, the rotational kinetic energy or the magnitude of angular momentum of the electronic device 100 may remain constant. Thus, the electronic device 100 may use the constant values of the rotational kinetic energy or the magnitude of angular momentum of the electronic device 100 to determine the duration of the free fall.

Specifically, for each sensor data sample i, the drop verification module 122 may calculate the rotational kinetic energy that is expressed as $K_i = I_x \omega_{xi}^2 + I_y \omega_{yi}^2 + I_z \omega_{zi}^2$ and the magnitude of the angular momentum that is expressed as $L_i = (I_x \omega_{xi})^2 + (I_y \omega_{yi})^2 + (I_z \omega_{zi})^2$. The rotational kinetic energy $K_i$ and magnitude of the angular momentum $L_i$ may be dependent on the principal moments of inertia and the angular velocity of the electronic device 100. The drop verification module 122 may determine that the electronic device 100 stays in a free fall state while both or either one of the rotational kinetic energy $K_i$ and the magnitude of angular momentum $L_i$ have constant values (with a predetermined margin). The drop verification module 122 may measure a duration for which the rotational kinetic energy $K_i$ and/or magnitude of the angular momentum $L_i$ remain constant, and may consider it as a duration for which the electronic device 100 remains in free fall. If the duration of free fall exceeds a predetermined time duration $t_{drop}$, the drop verification module 122 may determine that the second drop verification condition has been met. When the two-step drop verification is satisfied, the drop verification module 122 may determine that a true drop has occurred.

The processor 120 may use an adaptive sampling scheme for drop detection via the sampling rate adjusting module 123 in order to achieve high signal resolution while maintaining low battery consumption in our drop detection framework.

The adaptive sampling scheme according to embodiments of the present disclosure involves transitioning between two states. In a first state, the processor 120 may sample sensor data at a low frequency (e.g., 12 Hz) and only conduct free fall detection. Upon detecting a free fall, the processor 120 may enter into a second state and increase the sampling rate to a high frequency (e.g., 125 Hz). In the second state, the processor 120 may conduct both free fall detection and drop verification on the high-density sensor data that is sampled at the high frequency. The processor 120 may use a timer to control the duration of drop verification and regulate the duration of high-frequency sampling. If a free fall is detected in the second state, the processor 120 may not change the state but reset the timer to T seconds. The processor 120 will revert the state from the second stage to the first state after the timeout of the timer. Since free fall detection conditions are rarely triggered in daily life, the adaptive sampling scheme enables the drop detection framework to maintain low power consumption while obtaining high-resolution sensor data for drop detection or further analysis.

Specifically, the sampling rate adjusting module 123 may set a sampling rate for sampling sensor data at a high sampling rate (e.g., 125 Hz) during free fall, and may set the sampling rate at a low sampling rate (e.g., 12 Hz) when the electronic device 100 is in normal use to save energy. The processor 120 may poll the IMU sensor 110 to collect sensor data (such as accelerometer and gyroscope readings) at the low sampling rate (e.g., 12 Hz) when the electronic device 100 is in normal use to save energy. The processor 120 may poll the IMU sensor 110 with a high sampling rate (e.g., 125 Hz) during free fall.

The sampling rate adjusting module 123 may determine a start time and a duration of high-frequency sampling, based on the relationship between a pair of synchronized accelerometer and gyroscope readings (e.g., the relationship between centripetal acceleration from the gyroscope reading and the accelerometer reading) and truncation of the sensor data. To control the start and duration of high-frequency sampling, the same trigger event used for free fall detection can be employed. For example, the sampling rate adjusting module 123 may determine the duration of high-frequency sampling as a few seconds for each drop event. This adaptive sampling scheme collects a high-resolution signal for drop detection and avoids consuming excessive power at the same time.

The parameter updating module 124 of the processor 120 may update or correct the device parameters such as principal moments of inertia of the electronic device 100 and the position of the IMU sensor 110 inside the electronic device 100, which are stored in the memory 130, based on the sensor data collected from IMU sensor 110.

In conventional drop detection, intrinsic parameters of an electronic device such as principal moments of inertia I and the relative position r of an IMU sensor in the electronic device are typically assumed to be known. However, in practice, these parameters may be difficult to measure or estimate accurately. For instance, estimating the principal moments of inertia I requires a user to model the mass distribution of the electronic device, while determining the relative position r of the IMU necessitates identifying the electronic device's center of mass and IMU sensor position. However, the IMU sensor is often hidden within the electronic device and inaccessible from the outside, and different electronic device models may have different mass distributions. These factors make the relative position measurement infeasible and the estimation of the principal moments of inertia inaccurate.

According to embodiments of the present disclosure, the electronic device 100 utilizes a data-driven approach for improving the estimation of the principal moments of inertia I and calculating the relative position r using sensor data captured by the IMU sensor 110. Specifically, the parameter updating module 124 may obtain an initial estimation I' of the principal moments of inertia I by modeling the electronic device 100 as a cuboid with uniform density.

Figure 2:
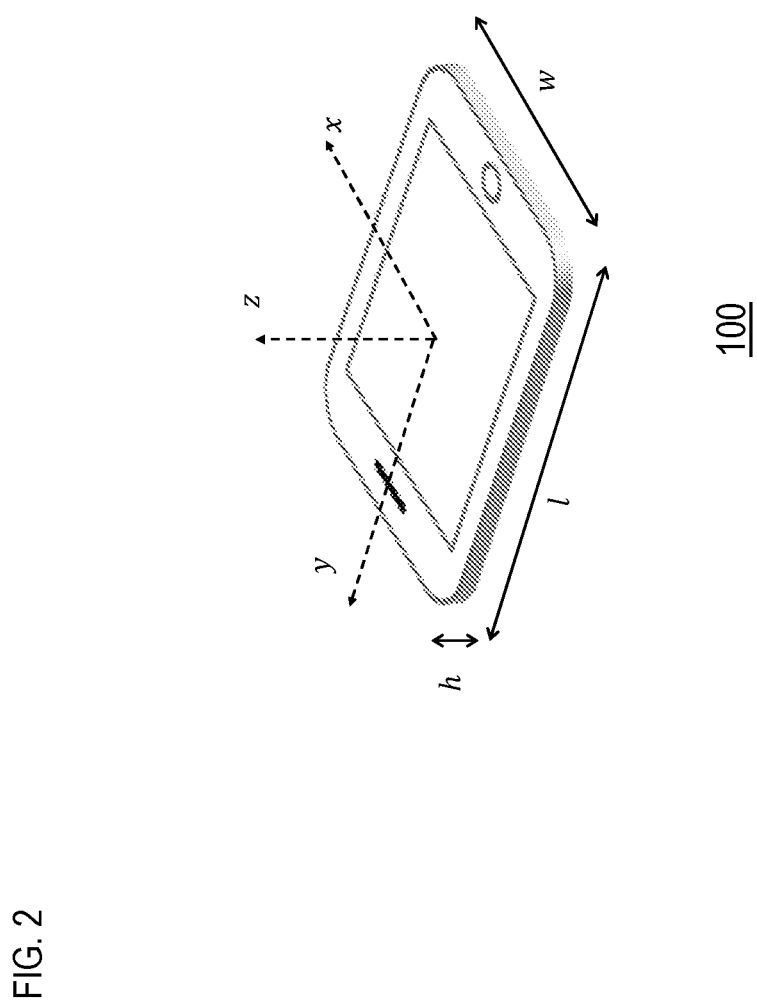
FIG. 2 illustrates dimensions of the electronic device according to embodiments of the present disclosure.

Referring to FIG. 2 illustrating dimensions of the electronic device 100, when the initial estimation I' is expressed as $I' = (I'_x, I'_y, I'_z)^T$, the initial estimation I' of the principal moments of inertia I of the electronic device 100 is calculated based on weight m, length l, width w, and thickness h of the electronic device 100 based on Equation (2).

$$I'_x = m(l^2 + h^2)/12$$

$$I'_y = m(w^2 + h^2)/12$$

$$I'_z = m(l^2 + w^2)/12 \qquad \text{Equation (2)}$$

The above formula is just an example of calculating the principal moments of inertia I of the electronic device 100 based on shape information of the electronic device 100. The formula may be changed if the electronic device 100 has another shape. The initial estimation I' of the principal moments of inertia I may be pre-calculated and pre-stored in a local memory of the electronic device 100.

In turn, when the electronic device 100 is dropped with rotation for M times for experiments, the electronic device 100 may update the initial estimation I' of the principal moments of inertia I by detecting the impact and recording N pairs of accelerometer and gyroscope readings. When $\hat{I}=(\hat{I}_x, \hat{I}_y, \hat{I}_z)^T$ denotes an updated estimation $\hat{I}$ of the principal moments of inertia I and $W_{ij}=(\omega_{xij}^2, \omega_{yij}^2, \omega{zij}^2)^T$ denotes an element-wise square of gyroscope reading $W_{ij}$ for an i-th data point in a j-th drop, the updated estimation $\hat{I}$ may be calculated based on Equation (3), under the assumption that the value $W_{ij}^T\hat{I}$ will be approximately the same for the same drop j since the rotational kinetic energy remains constant during free fall.

$$\min_{\hat{I}} \frac{1}{M}\sum_{j=1}^{M}\frac{1}{N_j}\sum_{i=1}^{N_j}\left(W_{ij}^T\hat{I} - \frac{1}{N_j}\sum_{i=1}^{N_j}W_{ij}^T\hat{I}\right)^2 + \lambda\|\hat{I} - I'\|^2 \quad \text{Equation (3)}$$

λ denotes a coefficient controlling the severity of the penalty applied to a difference between the initial estimation I' and the updated estimation $\hat{I}$ of the principal moments of inertia I.

The purpose of the min function is to reduce the variance of rotational kinetic energy while keeping the updated estimation $\hat{I}$ close to the initial estimation I'. The first part $$\frac{1}{M}\sum_{j=1}^{M}\frac{1}{N_j}\sum_{i=1}^{N_j}\left(W_{ij}^T\hat{I} - \frac{1}{N_j}\sum_{i=1}^{N_j}W_{ij}^T\hat{I}\right)^2$$

of the min function is to minimize the variance of $W_{ij}^T\hat{I}$ for every drop j. The second part of the min function is to keep the initial estimation I' of the principal moments of inertia I similar to the updated estimation $\hat{I}$ of the principal moments of inertia I by penalizing a large difference between the initial estimation I' and the updated estimation $\hat{I}$, ensuring that the updated estimation $\hat{I}$ and the initial estimation I' are similar.

Referring to Equation (3), the processor 120 may obtain, as the updated estimation $\hat{I}$ of the principal moments of inertia I of the electronic device 100, a vector value that minimizes the combination of (1) a variance of a product (i.e., $W_{ij}^T\hat{I}$) of the element-wise square of gyroscope reading (e.g., angular velocity data) $W_{ij}^T$ and the updated estimation $\hat{I}$ of the principal moments of inertia for every drop j, and (2) a difference (i.e., a $\lambda\|\hat{I}-I'\|^2$) between the updated estimation $\hat{I}$ and the initial estimation I' of the principal moments of inertia.

Based on the updated estimation $\hat{I}$, an updated position vector $\hat{r}$ may be calculated based on Equation (4):

$$\min_{\hat{r}} \frac{1}{M}\sum_{j=1}^{M}\frac{1}{N_j}\sum_{i=1}^{N_j}\|M_{ij}(\omega_{ij},\hat{I})\hat{r} - a_{ij}\|^2 \quad \text{Equation (4)}$$

The purpose of the min function is to minimize the difference between the centripetal acceleration $M_{ij}(\omega_{ij}, \hat{I})\hat{r}$ and the measured proper acceleration $a_{ij}$ during free fall, since the centripetal acceleration $M_{ij}(\omega_{ij}, \hat{I})\hat{r}$ becomes equal to the measured proper acceleration $a_{ij}$ during free fall. Here, $M_{ij}(\omega_{ij}, \hat{I})$ represents the transformation matrix that is mentioned above.

The free fall detection module 121 and the drop verification module 122 of the processor 120 may use the updated estimation $\hat{I}$ and updated position vector $\hat{r}$ instead of the initial estimation I' of the principal moments of inertia I and the position vector r that is calculated using the initial estimation I'.

The electronic device 100 may determine whether a true drop has occurred based on the sensor data that are collected at a high resolution during free fall, and the updated device parameters. The electronic device 100 may identify drop events at a high accuracy. For example, the electronic device 100 may recognize events in the left column of Table 1 below as drop events, and may recognize events in the right column of Table as non-drop events.

TABLE 1

| Positive Cases | Negative Cases |
| --- | --- |
| Drop onto carpet | Knock device against thigh |
| Drop onto sofa | Shake device in hand |
| Drop with slow rotation around x axis | Run with device in hand |
| Drop with slow rotation around y axis | Run with device in pocket |
| Drop with slow rotation around z axis | Run with device in bag |
| Drop with fast rotation around x axis | Jump with device in hand |
| Drop with fast rotation around y axis | Jump with device in pocket |
| Drop with fast rotation around z axis | Jump with device in bag |

Figure 3:
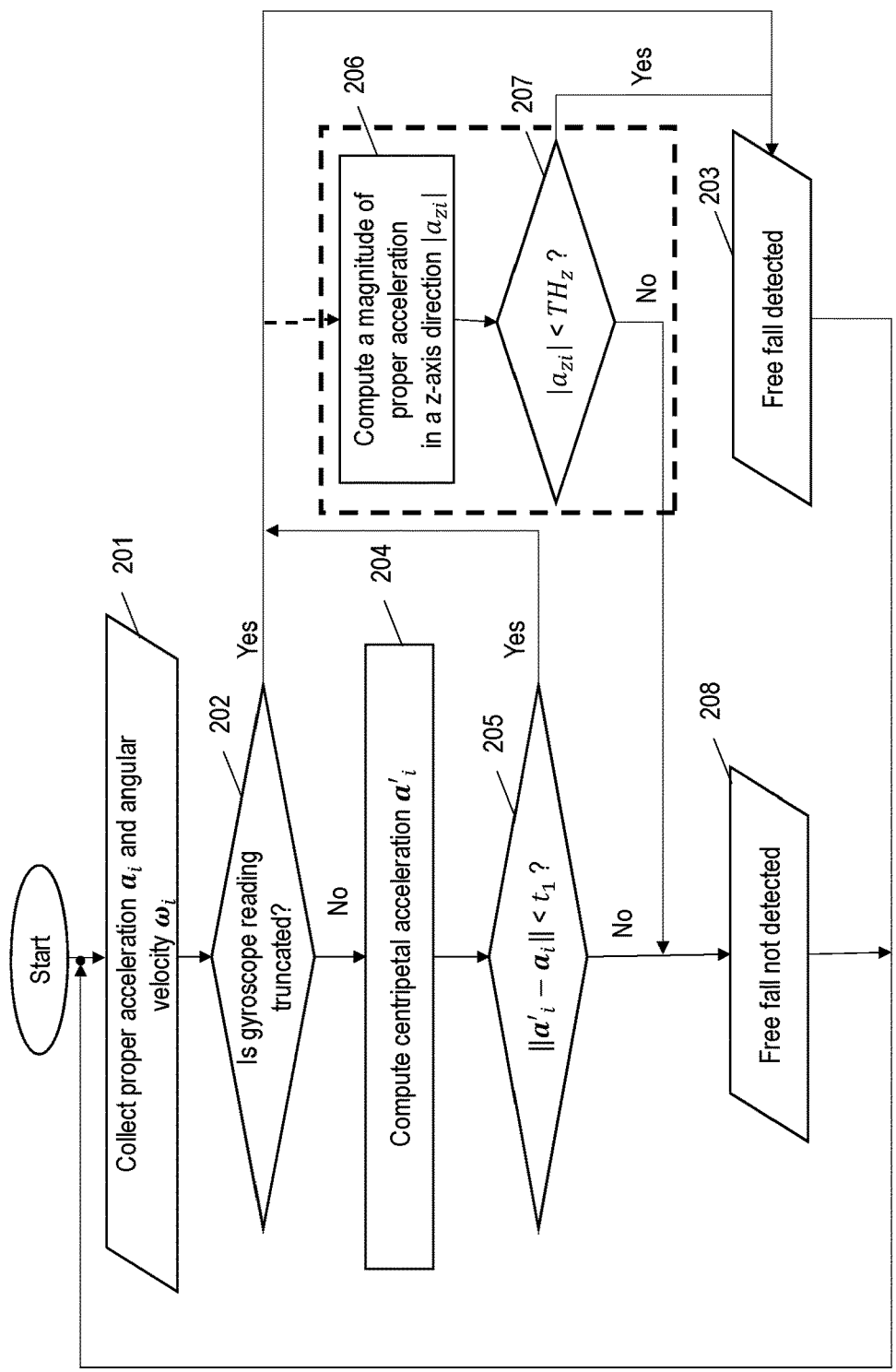
FIG. 3 is a flowchart illustrating a method of detecting a free fall state of an electronic device according to embodiments of the present disclosure.

FIG. 3 is a flowchart illustrating a method of detecting a free fall state of an electronic device according to embodiments of the present disclosure.

In operation 201, the accelerometer 111 and the gyroscope 112 may collect proper acceleration $a_i$ and angular velocity $\omega_i$, respectively.

In operation 202, the electronic device checks for truncation of gyroscope readings from the gyroscope 112.

If truncation has occurred, operation 203 confirms that the electronic device is in a free fall state.

If there is no truncation of gyroscope readings, the electronic device calculates centripetal acceleration $a'_i$ based on the angular velocity $\omega_i$ in operation 204.

In operation 205, the electronic device calculates an acceleration difference $\|a'_i - a_i\|$ between the centripetal acceleration $a'_i$ and the measured proper acceleration $a_i$, and determines whether the acceleration difference $\|a'_i - a_i\|$ is less than a predetermined threshold $t_1$.

If the acceleration difference $\|a'_i - a_i\|$ is less than the predetermined threshold $t_1$, operation 203 confirms that the electronic device is in a free fall state.

To enhance the above two trigger conditions that are used in operations 202 and 205, the electronic device may optically calculate a magnitude of the proper acceleration $a_i$ in a z-axis direction (i.e., $|a_{zi}|$) in operation 206, wherein the z-axis direction is a direction of the electronic device with the shortest length, among x, y, and z axis-directions of the electronic device. The z-axis direction may correspond to the thickness direction of the electronic device.

In operation 207, the electronic device determines whether the magnitude of the proper acceleration in the z-axis direction $|a_{zi}|$ is less than a predetermined threshold $TH_z$.

If the magnitude of the proper acceleration in the z-axis direction $|a_{zi}|$ is less than the predetermined threshold $TH_z$, operation 203 confirms that the electronic device is in a free fall state.

If the magnitude of the proper acceleration in the z-axis direction $|a_{zi}|$ is not less than the predetermined threshold $TH_z$, or the acceleration difference $\|a'_i - a_j\|$ is not less than the predetermined threshold $t_1$, operation 208 confirmed that the electronic device is not in a free fall state.

As shown in FIG. 3, a free fall state may be detected if any of the two conditions of operations 202 and 205 are met, with or without the satisfaction of the condition 207.

Figure 4:
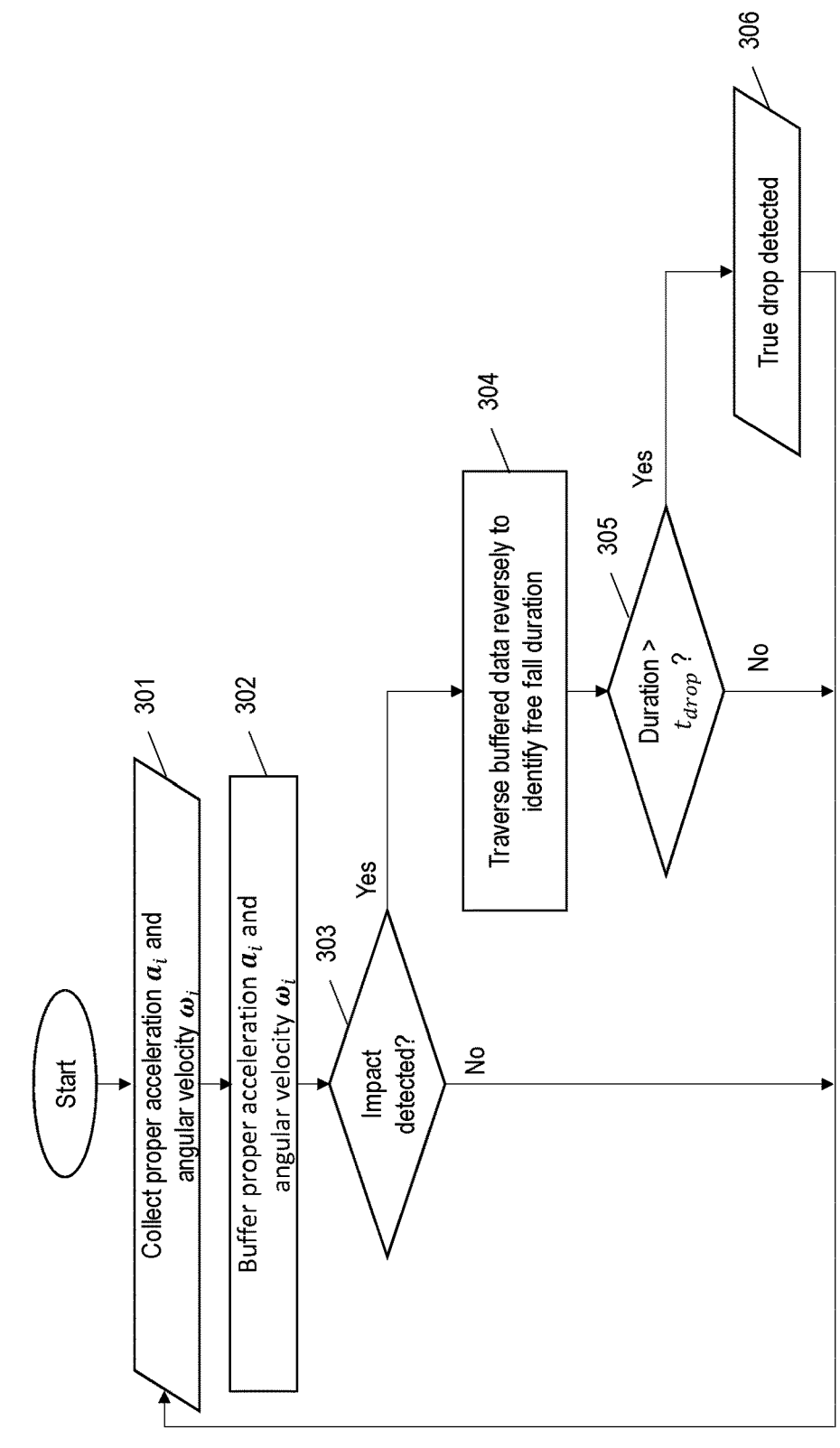
FIG. 4 is a flowchart illustrating a method of verifying a drop event according to embodiments of the present disclosure.
Figure 5:
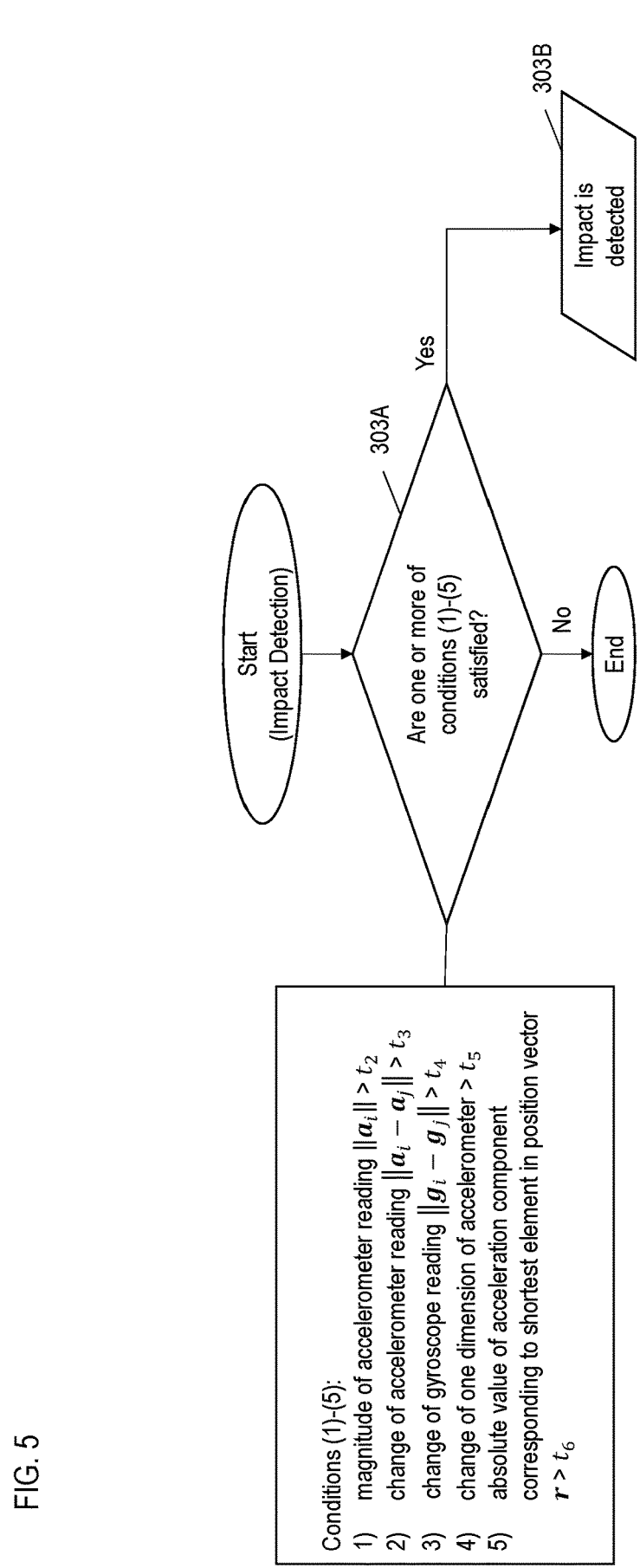
FIG. 5 is a flowchart illustrating a method of detecting an impact according to embodiments of the present disclosure.

FIG. 4 is a flowchart illustrating a method of verifying a drop according to embodiments of the present disclosure. FIG. 5 is a flowchart illustrating a method of detecting an impact according to embodiments of the present disclosure.

Not all events that satisfy a trigger condition of free fall are real drops. For example, when a user holds the electronic device and shakes it quickly, the electronic device may detect an impact caused by the fast rotation of the shaking action, although the electronic device is not dropped. In order to detect a true drop event and determine its start and end times, a drop verification algorithm is provided according to embodiments of the present disclosure. The drop verification algorithm may use two conditions for drop verification. Firstly, the drop verification algorithm may detect one or more impacts that the electronic device will experience before reaching a static state. Secondly, the drop verification algorithm ensures that the electronic device has remained in free fall for a sufficient period. By examining the gyroscope and accelerometer readings, the drop detection framework according to embodiments is capable of distinguishing between a true drop event and other forms of impact, while also accounting for potential disruptions in the data caused by device rotation or other external factors. The drop verification algorithm follows these specific operational steps.

In operation 301, proper acceleration $a_i$ and angular velocity $\omega_i$ are collected from the accelerometer 111 and the gyroscope 112, respectively.

In operation 302, the proper acceleration $a_i$ and the angular velocity $\omega_i$ are buffered in a memory for a specific time period, or up to a specific data storage limit.

In operation 303, the electronic device determines whether an impact has occurred. Specifically, referring to FIG. 5, in operation 303A, the electronic device determines whether any one or any combination of the following conditions has occurred:

Impact Detection Condition 1: a magnitude of accelerometer reading $\|a_i\|$ exceeds a predetermined threshold $t_2$.

Impact Detection Condition 2: a change of accelerometer reading $\|a_i - a_j\|$ exceeds a predetermined threshold $t_3$, wherein $j < i$.

Impact Detection Condition 3: a change of gyroscope reading $\|g_i - g_j\|$ exceeds a predetermined threshold $t_4$, wherein $j < i$.

Impact Detection Condition 4: a change of one dimension of the accelerometer reading exceeds a predetermined threshold $t_5$.

Impact Detection Condition 5: an absolute value of the acceleration component corresponding to the shortest element in position vector r (e.g., $|a_{zi}|$ for shortest $r_z$) exceeds a predetermined threshold $t_6$.

In operation 303B, when any one or any combination of the above conditions has occurred, the electronic device determines that an impact has occurred.

Referring back to FIG. 4, in operation 304, upon detection of the impact, the electronic device traverses the buffered data of proper acceleration $a_i$ and angular velocity $\omega_i$ reversely to identify a duration of a free fall that occurred prior to the impact.

In operation 305, the electronic device determines whether the free fall duration is greater than a predetermined time duration $t_{drop}$.

If the free fall duration is greater than a predetermined time duration $t_{drop}$, the electronic device verifies the free fall as a true drop, in operation 306.

Figure 6:
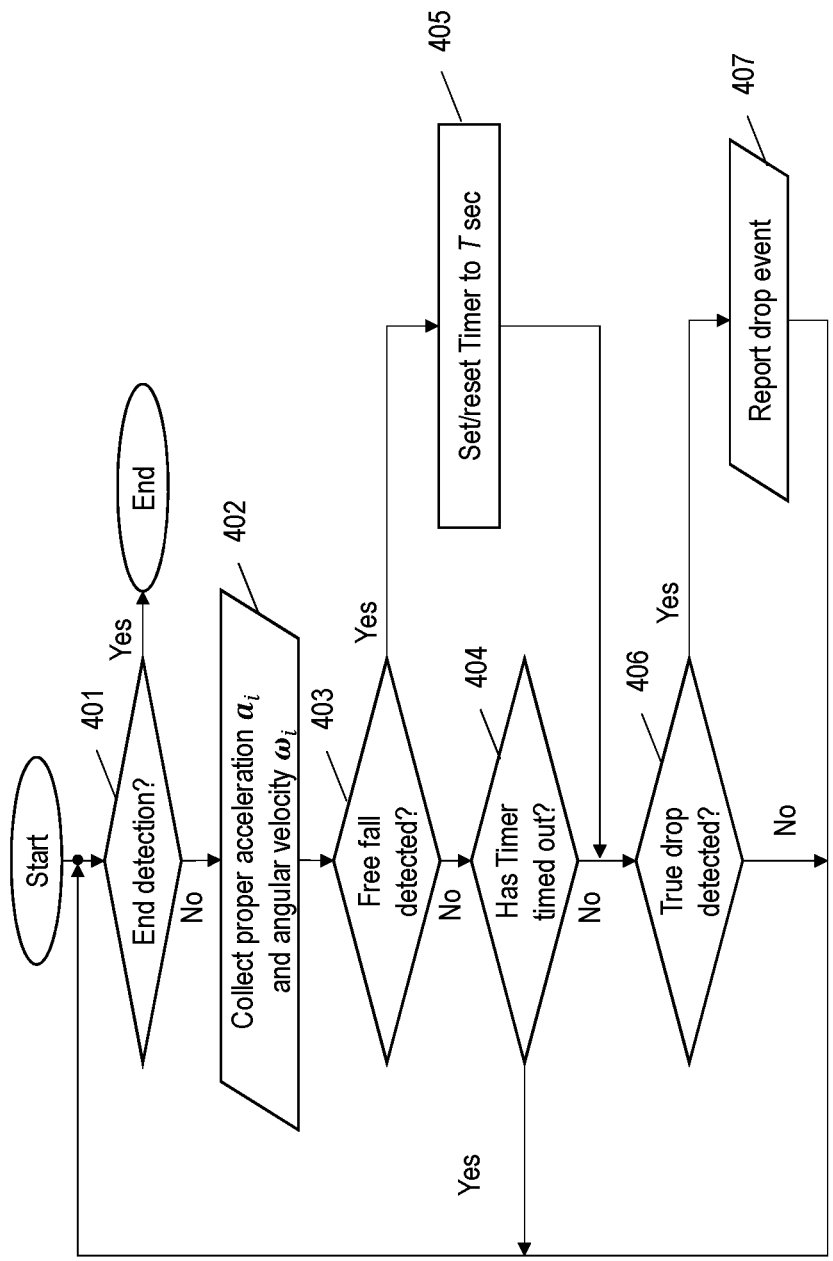
FIG. 6 is a flowchart illustrating an overall method of detecting and reporting a drop event according to embodiments of the present disclosure.

FIG. 6 is a flowchart illustrating an overall method of detecting and reporting a drop event according to embodiments of the present disclosure.

The drop detection framework according to embodiments of the present application operates as a continuous loop, continuously monitoring and detecting drop events until prompted to stop by the user. The drop detection process begins with the collection of synchronized accelerometer and gyroscope data, which are then fed into the free fall detection module 121. The free fall detection module 121 checks if any free fall condition has been met. If a free fall is detected for the first time, a timer is set for T seconds, representing the duration of drop verification. If a timer is already running with remaining time less than T seconds, it is reset to T seconds. Before the timer times out, all the collected accelerometer and gyroscope data are passed to the drop verification module 122 to determine whether the collected accelerometer and gyroscope data signify a drop event. If a drop event is verified to be true, the verified drop event is reported. This drop detection process ensures accurate and efficient drop detection, as the loop continues until instructed to stop. The use of timers allows the drop detection framework to differentiate between a free fall and a drop event, leading to more reliable results.

Specifically, in operation 401, the electronic device checks whether the user has provided an input to stop drop detection. If no such input is detected, the electronic device will continue to collect data on proper acceleration $a_i$ and angular velocity $\omega_i$ from the accelerometer 111 and gyroscope 112 until the user provides an input to end the drop detection, in operation 402.

In operation 403, the electronic device checks if a free fall state is detected. For example, operation 403 may include performing operations 201-208 shown in FIG. 3 to determine whether the electronic device is in a free fall state.

When a free fall state is detected, the electronic device starts a timer for T seconds, and if another free fall state is detected before T seconds have elapsed, the timer is reset for another T seconds, in operation 405.

In operation 403, if a free fall state is detected, the electronic device checks if the timer has timed out in operation 404. If the timer has not expired, the device sends all the collected accelerometer and gyroscope data to the drop verification module 122 to determine if the data indicates a drop event in operation 406. Operation 406 may include steps 301-306 shown in FIG. 4 to verify whether the electronic device has experienced a true drop.

If a true drop event is confirmed in operation 406, the electronic device records and reports the event in operation 407. The device can display the drop event or transmit the drop event information to an external device.

Figure 7:
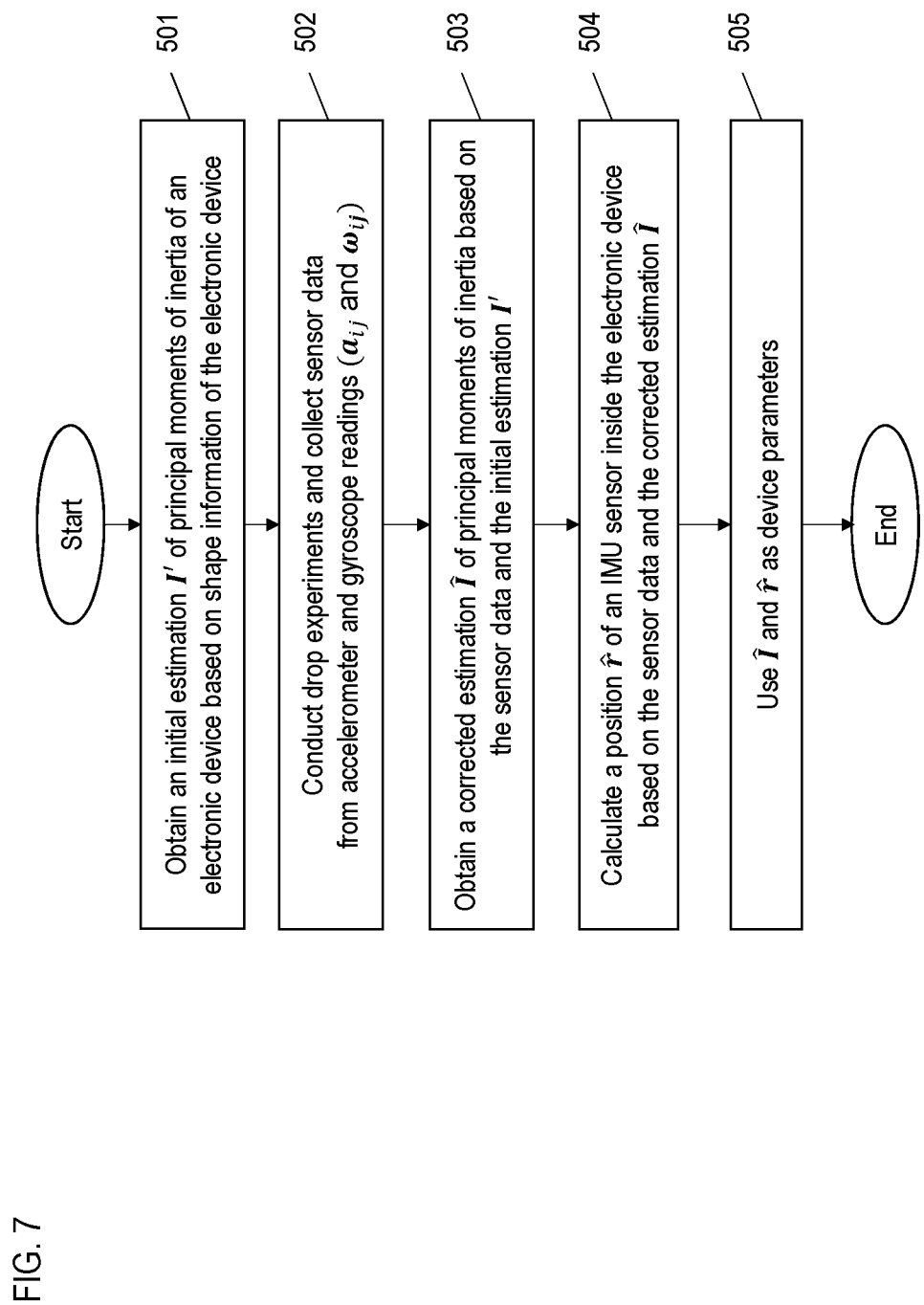
FIG. 7 is a flowchart illustrating a method of updating internal parameters of an electronic device according to embodiments of the present disclosure.

FIG. 7 is a flowchart illustrating a method of updating internal parameters of an electronic device according to embodiments of the present disclosure. The electronic device may update device parameters such as principal moments of inertia of the electronic device and the position of an IMU sensor inside the electronic device, which are stored in a memory of the electronic device, based on sensor data collected from the IMU sensor.

In operation 501, the electronic device may obtain an initial estimation I' of principal moments of inertia of the electronic device, for example, by modeling the electronic device as a cuboid with uniform density. The initial estimation I' of the principal moments of inertia I of the electronic device may be calculated using Equation (2) provided above.

In operation 502, the electronic device collects accelerometer and gyroscope data from the IMU sensor when the electronic device 100 is dropped multiple times for experiments. The accelerometer and gyroscope data may include proper acceleration $a_t$ and angular velocity $\omega_t$ that are measured by the accelerometer 111 and gyroscope 112.

In operation 503, the electronic device may obtain a corrected estimation $\hat{I}$ of principal moments of inertia of the electronic device by correcting the initial estimation I' based on the accelerometer and gyroscope data. For example, the electronic device may obtain the corrected estimation $\hat{I}$ using Equation (3) provided above.

In operation 504, the electronic device may calculate a corrected position $\hat{r}$ of the IMU sensor inside the electronic device based on the accelerometer and gyroscope data, and the corrected estimation $\hat{I}$. For example, the electronic device may obtain the corrected position $\hat{r}$ of the IMU sensor using Equation (4) provided above.

In operation 505, the electronic device uses the corrected estimation $\hat{I}$ and the corrected position $\hat{r}$ as devices parameters of the electronic device when the electronic device performs the drop detection and verification process.

Figure 8:
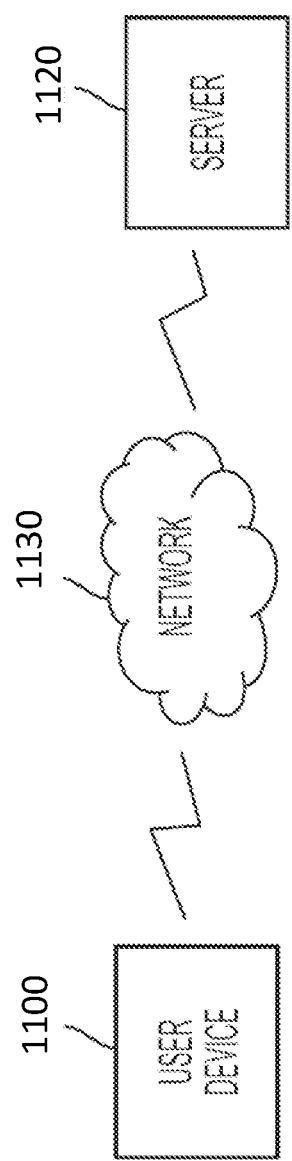
FIG. 8 is a diagram of devices for performing drop detection according to embodiments of the present disclosure.

FIG. 8 is a diagram of devices for performing drop detection according to embodiments of the present disclosure. FIG. 8 includes a user device 1100, a server 1120, and a network 1130. The user device 1100 and the server 1120 may interconnect via wired connections, wireless connections, or a combination of wired and wireless connections.

The user device 1100 includes one or more hardware and software components configured to detect a drop event. For example, the user device 1100 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device.

The user device 1100 may include the IMU sensor 110, one or more components of the processor 120, the memory 130, and the communication interface 140. One or more elements of the free fall detection module 121, the drop verification module 122, the sampling rate adjusting module 123, and the parameter updating module 124, may be included in the user device 1100, and the rest of the elements may be included in the server 1120. Alternatively, all the elements of the processor 120 shown in FIG. 1 may be included in the user device 1100.

The server 1120 includes one or more hardware and software components configured to detect a drop event, and transmit a result of the drop event to the user device 1100. For example, the user device 1100 may transmit accelerometer and gyroscope data to the server 1120, and the server 1120 may detect a drop event based on the accelerometer and gyroscope data.

The network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) may perform one or more functions described as being performed by another set of devices.

Figure 9:
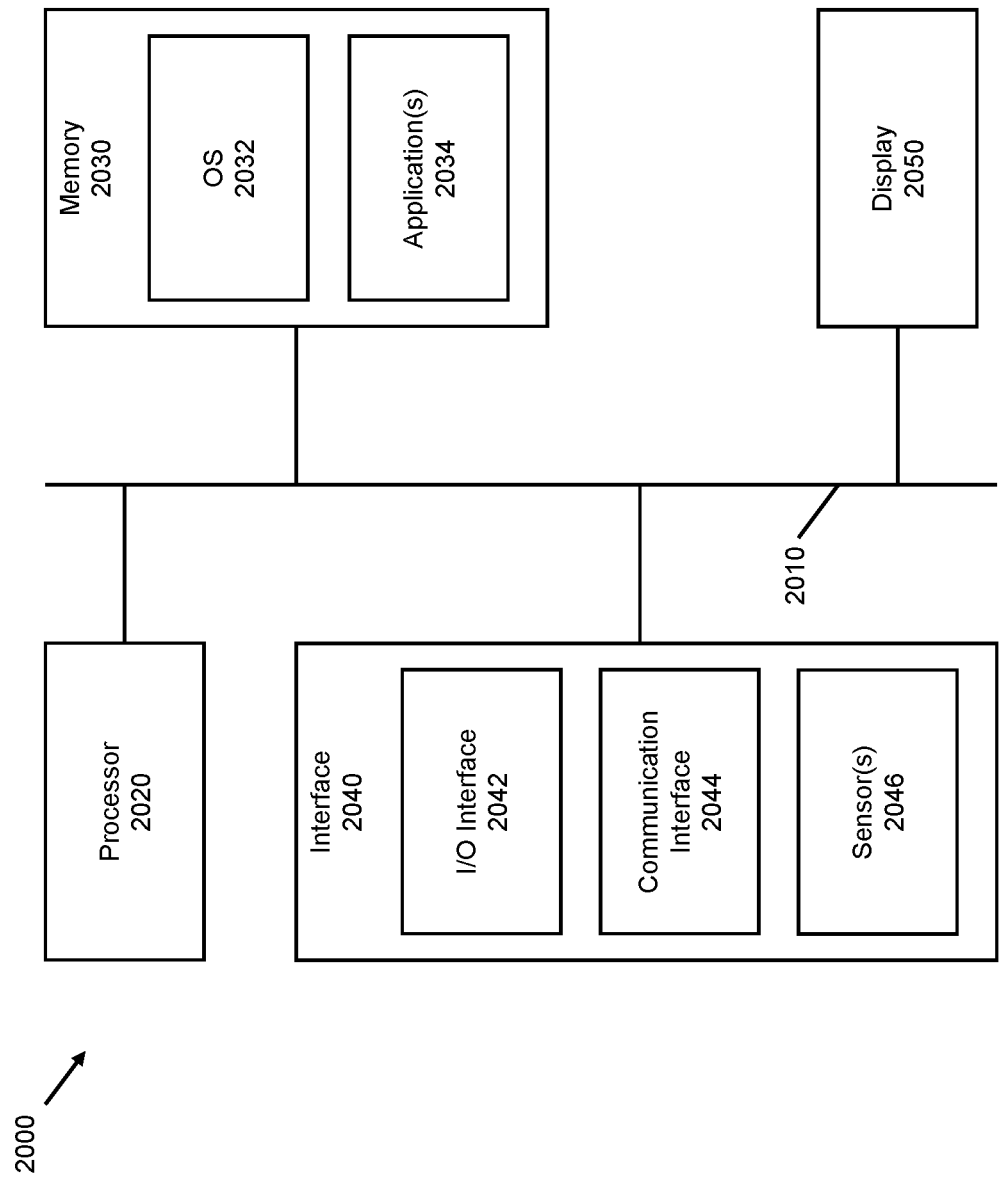
FIG. 9 is a diagram of components of one or more devices of FIG. 8 according to embodiments of the present disclosure.

FIG. 9 is a diagram of components of one or more devices of FIG. 8 according to embodiments of the present disclosure. An electronic device 2000 may correspond to the user device 1100 and/or the server 1120.

The electronic device 2000 includes a bus 2010, a processor 2020, a memory 2030, an interface 2040, and a display 2050.

The bus 2010 includes a circuit for connecting the components 2020 to 2050 with one another. The bus 2010 functions as a communication system for transferring data between the components 2020 to 2050 or between electronic devices.

The processor 2020 includes one or more of a central processing unit (CPU), a graphics processor unit (GPU), an accelerated processing unit (APU), a many integrated core (MIC), a field-programmable gate array (FPGA), a digital signal processor (DSP), a machine learning accelerator, a neural processing unit (NPU). The processor 2020 may be a single core processor or a multi core processor. The processor 2020 is able to perform control of any one or any combination of the other components of the electronic device 2000, and/or perform an operation or data processing relating to communication. For example, the processor 2020 may include the free fall detection module 121, the drop verification module 122, the sampling rate adjusting module 123, and the parameter updating module 124 shown in FIG. 1. The processor 2020 executes one or more programs stored in the memory 2030.

The memory 2030 may include a volatile and/or non-volatile memory. The memory 2030 stores information, such as one or more of commands, data, programs (one or more instructions), applications 2034, etc., which are related to at least one other component of the electronic device 2000 and for driving and controlling the electronic device 2000. For example, commands and/or data may formulate an operating system (OS) 2032. Information stored in the memory 2030 may be executed by the processor 2020.

The applications 2034 include the above-discussed embodiments. These functions can be performed by a single application or by multiple applications that each carries out one or more of these functions.

The display 2050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 2050 can also be a depth-aware display, such as a multi-focal display. The display 2050 is able to present, for example, various contents, such as text, images, videos, icons, and symbols.

The interface 2040 includes input/output (I/O) interface 2042, communication interface 2044, and/or one or more sensors 2046. The I/O interface 2042 serves as an interface that can, for example, transfer commands and/or data between a user and/or other external devices and other component(s) of the electronic device 2000.

The communication interface 2044 may enable communication between the electronic device 2000 and other external devices, via a wired connection, a wireless connection, or a combination of wired and wireless connections. The communication interface 2044 may permit the electronic device 2000 to receive information from another device and/or provide information to another device. For example, the communication interface 2044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 2044 may receive or transmit a raw image, a processed image, and/or authentication metadata from or to an external device.

The sensor(s) 2046 of the interface 2040 can meter a physical quantity or detect an activation state of the electronic device 2000 and convert metered or detected information into an electrical signal. For example, the sensor(s) 2046 may include an inertial measurement unit (IMU) sensor such as the accelerometer 111 and the gyroscope 112 illustrated in FIG. 1. The sensor(s) 2046 can also include any one or any combination of a camera, a microphone, a keyboard, a mouse, and one or more buttons for touch input. In addition, the sensor(s) 2046 can include a control circuit for controlling at least one of the sensors included herein. Any of these sensor(s) 2046 can be located within or coupled to the electronic device 2000.

The drop detection system and method according to embodiments of the present disclosure may optimize the management of mobile devices in business scenarios by automatically detecting drop events and allowing IT administrators to analyze the cause and prevent damage or loss. Mobile devices or wireless-connected devices are susceptible to damage or loss due to drops, such as a cracked smartphone screen or lost wireless earbud. In business scenarios, IT administrators may not receive a report of a drop event until after damage or loss has occurred. Automatic detection of drop events on the device allows IT administrators to quickly identify and analyze the cause of the drop and implement solutions to prevent future damage or loss.

Also, phone insurance companies can use the drop detection system and method to perform statistical analysis on drop events and calculate premiums based on the risk associated with them. Phone damage, such as screen cracks, is a significant factor in phone insurance claims. As drops are a common cause of phone damage, the ability to track drop events enables phone insurance companies to gather statistics on these risky events and adjust their premiums accordingly.

The drop detection system and method can also be used for flight analysis of smart sports equipment on a mobile device by detecting free-fall segments of a wirelessly connected device and enabling on-device flight analysis. By obtaining IMU data from a wirelessly connected smart sports device, such as a smart basketball, rather than from the mobile device itself, the drop detection framework can be leveraged to identify free-fall segments of the sports device on a mobile device, which is the first step of on-device flight analysis.

The drop detection method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The drop detection method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of a server.

While the embodiments of the disclosure have been described with reference to the figures, it will be understood by those of ordinary skill in the art that various changes in form and details may be made therein without departing from the spirit and scope as defined by the following claims.

What is claimed is:

1. A method for detecting a drop event of an electronic device, the method comprising:
    obtaining an angular velocity and a proper acceleration of the electronic device based on sensor data received from an inertial measurement unit (IMU) sensor of the electronic device;
    obtaining a centripetal acceleration of the electronic device by computing a transition matrix having respective vectors of the angular velocity, principal moments of inertia of the electronic device, and a position of the IMU sensor within the electronic device, as inputs to the transition matrix;
    based on an acceleration difference between the centripetal acceleration and the proper acceleration, determining whether the electronic device is in a fall state; and
    based on the electronic device being determined to be in the fall state, providing an analysis result of the drop event.

2. The method of claim 1, further comprising:
    determining that the electronic device is in the fall state when the acceleration difference between the centripetal acceleration and the proper acceleration is less than a first predetermined threshold.

3. The method of claim 1, further comprising:
    determining that the electronic device is in the fall state when the angular velocity is not within a measurement range of the IMU sensor and truncation of the sensor data has occurred.

4. The method of claim 1, wherein a first trigger condition is satisfied when the acceleration difference between the centripetal acceleration and the proper acceleration is less than a first predetermined threshold, and a second trigger condition is satisfied when the angular velocity is not within a measurement range of the IMU sensor and truncation of the sensor data has occurred,
wherein the method further comprises:
determining that the electronic device is in the fall state when at least one of the first trigger condition and the second trigger condition is satisfied and a magnitude of the proper acceleration in a z-axis direction of the electronic device is less than a second predetermined threshold, wherein the z-axis direction of the electronic device is a direction in which a shortest side of the electronic device extends.

5. The method of claim 1, further comprising:
based on the electronic device being determined to be in the fall state, increasing a sampling rate for collecting the sensor data from the IMU sensor.

6. The method of claim 1, further comprising:
detecting an impact on the electronic device based on a magnitude of the proper acceleration;
based on the impact being detected, determining a fall duration during which the electronic device maintains the fall state until the impact is detected; and
verifying the drop event of the electronic device based on the fall duration.

7. The method of claim 6, wherein the detecting of the impact on the electronic device comprises:
determining that the impact has occurred based on the magnitude of the proper acceleration, and at least one of a change of the angular velocity over time, a change of the proper acceleration over time, and a magnitude of the proper acceleration in a z-axis direction of the electronic device,
wherein the z-axis direction of the electronic device is a direction in which a shortest side of the electronic device extends.

8. The method of claim 1, further comprising:
determining the principal moments of inertia of the electronic device based on predetermined principal moments of inertia of a device type corresponding to the electronic device, and angular velocity data and proper acceleration data collected during previous drops of the electronic device.

9. The method of claim 8, wherein the determining of the principal moments of inertia of the electronic device further comprises:
applying an objective function to the predetermined principal moments of inertia, and a variance of the angular velocity data and the proper acceleration data collected during the previous drops of the electronic device, to minimize a variance of rotational kinetic energy while minimizing a difference between the principal moments of inertia of the electronic device and the predetermined principal moments of inertia.

10. An electronic device for detecting a drop event, the electronic device comprising:
an inertial measurement unit (IMU) sensor configured to collect sensor data that indicates an angular velocity and a proper acceleration of the electronic device;
at least memory storing instructions; and
at least one processor configured to execute the instructions to:
obtain the angular velocity and the proper acceleration of the electronic device based on the sensor data;
obtain a centripetal acceleration of the electronic device by computing a transition matrix having respective vectors of the angular velocity, principal moments of inertia of the electronic device, and a position of the IMU sensor within the electronic device, as inputs to the transition matrix;
based on an acceleration difference between the centripetal acceleration and the proper acceleration, determine whether the electronic device is in a fall state; and
based on the electronic device being determined to be in the fall state, provide an analysis result of the drop event.

11. The electronic device of claim 10, wherein the at least one processor is further configured to execute the instructions to:
determine that the electronic device is in the fall state when the acceleration difference between the centripetal acceleration and the proper acceleration is less than a first predetermined threshold.

12. The electronic device of claim 10, wherein the at least one processor is further configured to execute the instructions to:
determine that the electronic device is in the fall state when the angular velocity is not within a measurement range of the IMU sensor and truncation of the sensor data has occurred.

13. The electronic device of claim 10, wherein a first trigger condition is satisfied when the acceleration difference between the centripetal acceleration and the proper acceleration is less than a first predetermined threshold, and a second trigger condition is satisfied when the angular velocity is not within a measurement range of the IMU sensor and truncation of the sensor data has occurred,
wherein the at least one processor is further configured to execute the instructions to:
determine that the electronic device is in the fall state when at least one of the first trigger condition and the second trigger condition is satisfied and a magnitude of the proper acceleration in a z-axis direction of the electronic device is less than a second predetermined threshold, wherein the z-axis direction of the electronic device is a direction in which a shortest side of the electronic device extends.

14. The electronic device of claim 10, wherein the at least one processor is further configured to execute the instructions to:
based on the electronic device being determined to be in the fall state, increase a sampling rate for collecting the sensor data from the IMU sensor.

15. The electronic device of claim 10, wherein the at least one processor is further configured to execute the instructions to:
detect an impact on the electronic device based on a magnitude of the proper acceleration;
based on the impact being detected, determine a fall duration during which the electronic device maintains the fall state until the impact is detected; and
verify the drop event of the electronic device based on the fall duration.

16. The electronic device of claim 15, wherein the at least one processor is further configured to execute the instructions to:
determine that the impact has occurred based on the magnitude of the proper acceleration, and at least one of a change of the angular velocity over time, a change of the proper acceleration over time, and a magnitude of the proper acceleration in a z-axis direction of the electronic device, wherein the z-axis direction of the electronic device is a direction in which a shortest side of the electronic device extends.

17. The electronic device of claim 10, wherein the at least one processor is further configured to execute the instructions to:

determine the principal moments of inertia of the electronic device based on predetermined principal moments of inertia of a device type corresponding to the electronic device, and angular velocity data and proper acceleration data collected during previous drops of the electronic device.

18. The electronic device of claim 17, wherein the at least one processor is further configured to execute the instructions to:

apply an objective function to the predetermined principal moments of inertia and a variance of the angular velocity data and the proper acceleration data collected during the previous drops of the electronic device, to minimize a variance of rotational kinetic energy while minimizing a difference between the principal moments of inertia of the electronic device and the predetermined principal moments of inertia.

19. A non-transitory computer readable storage medium that stores instructions to be executed by at least one processor to perform a method for detecting a drop event of an electronic device, the method comprising:

obtaining an angular velocity and a proper acceleration of the electronic device based on sensor data received from an inertial measurement unit (IMU) sensor of the electronic device;

obtaining a centripetal acceleration of the electronic device by computing a transition matrix having respective vectors of the angular velocity, principal moments of inertia of the electronic device, and a position of the IMU sensor within the electronic device;

based on an acceleration difference between the centripetal acceleration and the proper acceleration, determining whether the electronic device is in a fall state; and based on the electronic device being determined to be in the fall state, providing an analysis result of the drop event.

* * * * *